(12) United States Patent
Tanaka et al.

(10) Patent No.: US 11,976,923 B2
(45) Date of Patent: May 7, 2024

(54) PHYSICAL QUANTITY DETECTION CIRCUIT, PHYSICAL QUANTITY SENSOR, AND OPERATING METHOD FOR PHYSICAL QUANTITY DETECTION CIRCUIT

(71) Applicant: Seiko Epson Corporation, Toyko (JP)

(72) Inventors: Atsushi Tanaka, Minowa (JP); Katsuhito Nakajima, Minowa (JP)

(73) Assignee: SEIKO EPSON CORPORATION (JP)

( * ) Notice: Subject to any disclaimer, the term of this patent is extended or adjusted under 35 U.S.C. 154(b) by 193 days.

(21) Appl. No.: 17/198,305

(22) Filed: Mar. 11, 2021

(65) Prior Publication Data
US 2021/0285769 A1 Sep. 16, 2021

(30) Foreign Application Priority Data
Mar. 12, 2020 (JP) ................................ 2020-042698

(51) Int. Cl.
*G01C 19/5776* (2012.01)
(52) U.S. Cl.
CPC ................................ *G01C 19/5776* (2013.01)
(58) Field of Classification Search
CPC ................................................. G01C 19/5776
See application file for complete search history.

(56) References Cited

U.S. PATENT DOCUMENTS

| 5,736,951 A | 4/1998 | Kobatake |
| 6,380,874 B1 * | 4/2002 | Knudsen ............... H03M 3/388 |
| | | 341/118 |
| 2006/0003722 A1 * | 1/2006 | Tuttle ....................... H04B 1/28 |
| | | 455/285 |

(Continued)

FOREIGN PATENT DOCUMENTS

| JP | 0594423 | * 4/1994 | ............. G11B 11/10 |
| JP | H09-55661 A | 2/1997 | |

(Continued)

OTHER PUBLICATIONS

Analog-Digital Conversion, Fundamentals of Sampled Data Systems, Chapter 2, https://www.analog.com/media/en/training-seminars/design-handbooks/Data-Conversion-Handbook/Chapter2.pdf.*

*Primary Examiner* — Alexander Satanovsky
(74) *Attorney, Agent, or Firm* — Harness, Dickey & Pierce, P.L.C.

(57) ABSTRACT

A physical quantity detection circuit includes: an analog/digital conversion circuit performing analog/digital conversion processing on an analog signal based on an output signal from a physical quantity detection element and outputting a first digital signal; a digital arithmetic circuit having the first digital signal inputted thereto, performing arithmetic processing on the first digital signal, and outputting a second digital signal; and a regulator circuit supplying a power-supply voltage to the analog/digital conversion circuit and the digital arithmetic circuit. The digital arithmetic circuit does not perform an arithmetic processing start operation to start the arithmetic processing and an arithmetic processing end operation to end the arithmetic processing, during an analog/digital conversion period when the analog/digital conversion is performed.

8 Claims, 12 Drawing Sheets

(56) References Cited

U.S. PATENT DOCUMENTS

| | | | | |
|---|---|---|---|---|
| 2007/0035504 | A1* | 2/2007 | Yamada | G02B 26/101 345/99 |
| 2007/0229341 | A1 | 10/2007 | Kawano | |
| 2012/0221252 | A1* | 8/2012 | Heinz | G01N 21/6428 702/19 |
| 2015/0145609 | A1* | 5/2015 | Higuchi | H03K 3/03 331/66 |

FOREIGN PATENT DOCUMENTS

| | | |
|---|---|---|
| JP | 2007-281695 A | 10/2007 |
| JP | 2015-090638 A | 5/2015 |
| JP | 2015-104035 A | 6/2015 |
| JP | 2018-136255 A | 8/2018 |

* cited by examiner

PHYSICAL QUANTITY DETECTION CIRCUIT, PHYSICAL QUANTITY SENSOR, AND OPERATING METHOD FOR PHYSICAL QUANTITY DETECTION CIRCUIT

The present application is based on, and claims priority from JP Application Serial Number 2020-042698, filed Mar. 12, 2020, the disclosure of which is hereby incorporated by reference herein in its entirety.

BACKGROUND

1. Technical Field

The present disclosure relates to a physical quantity detection circuit, a physical quantity sensor, and an operating method for a physical quantity detection circuit.

2. Related Art

Currently, a physical quantity sensors that can detect various physical quantities such as a gyro sensor detecting an angular velocity or an acceleration sensor detecting an acceleration is broadly used in various systems and electronic apparatuses. Generally, to make a physical quantity sensor function, an analog signal based on an output signal from a physical quantity detection element is converted to a digital signal and arithmetic processing based on the digital signal is performed.

JP-A-2015-104035 discloses a configuration which has a detection circuit 60 having an A/D conversion circuit 100 and a control unit 140 having a DSP unit 150 and in which the A/D conversion circuit 100 converts an output signal from a vibrator 10 and the DSP unit processes the converted digital signal. JP-A-2015-104035 also discloses that a power-supply voltage is supplied to the detection circuit 60 and the control circuit 140 from a regulator circuit 22.

Generally, the DSP unit waits without performing any computation unless a digital signal to be processed is provided. When a digital signal to be processed is inputted, the DSP unit starts operation. The DSP unit ends operation on finishing computation of a predetermined sequence. Therefore, electricity consumption suddenly changes at the start timing when the DSP unit starts operation and at the end timing when the DSP unit ends operation. Consequently, at the start timing and the end timing, a load is applied on the regulator circuit and the output voltage from regulator circuit changes. Thus, the configuration in which a power-supply voltage is supplied to the DSP unit and the A/D conversion circuit from the common regulator circuit as in the related art has a problem in that, due to the change in the output voltage from the regulator circuit, the digital signal outputted from the A/D conversion circuit changes and the accuracy of A/D conversion drops.

SUMMARY

A physical quantity detection circuit includes: an analog/digital conversion circuit performing analog/digital conversion processing on an analog signal based on an output signal from a physical quantity detection element and outputting a first digital signal; a digital arithmetic circuit having the first digital signal inputted thereto, performing arithmetic processing on the first digital signal, and outputting a second digital signal; and a regulator circuit supplying a power-supply voltage to the analog/digital conversion circuit and the digital arithmetic circuit. The digital arithmetic circuit is configured not to perform an arithmetic processing start operation to start the arithmetic processing and an arithmetic processing end operation to end the arithmetic processing, during an analog/digital conversion period when the analog/digital conversion is performed.

A physical quantity sensor includes the physical quantity detection circuit and the physical quantity detection element.

An operating method fora physical quantity detection circuit is for a physical quantity detection circuit including: an analog/digital conversion circuit performing analog/digital conversion processing on an analog signal based on an output signal from a physical quantity detection element and outputting a first digital signal; a digital arithmetic circuit having the first digital signal inputted thereto, performing arithmetic processing on the first digital signal, and outputting a second digital signal; and a regulator circuit supplying a power-supply voltage to the analog/digital conversion circuit and the digital arithmetic circuit. The operating method includes: causing the digital arithmetic circuit not to perform an arithmetic processing start operation to start the arithmetic processing and an arithmetic processing end operation to end the arithmetic processing, during an analog/digital conversion period when the analog/digital conversion is performed.

DESCRIPTION OF EXEMPLARY EMBODIMENTS

1. First Embodiment

A preferred embodiment of the present disclosure will now be described in detail with reference to the drawings. However, the embodiment described below should not unduly limit the content of the present disclosure described in the appended claims. Not all the components described below are necessarily essential components of the present disclosure.

In the description below, a physical quantity sensor detecting an angular velocity as a physical quantity, that is, an angular velocity sensor, is employed as an example.

1-1. Configuration of Physical Quantity Sensor

Figure 1:
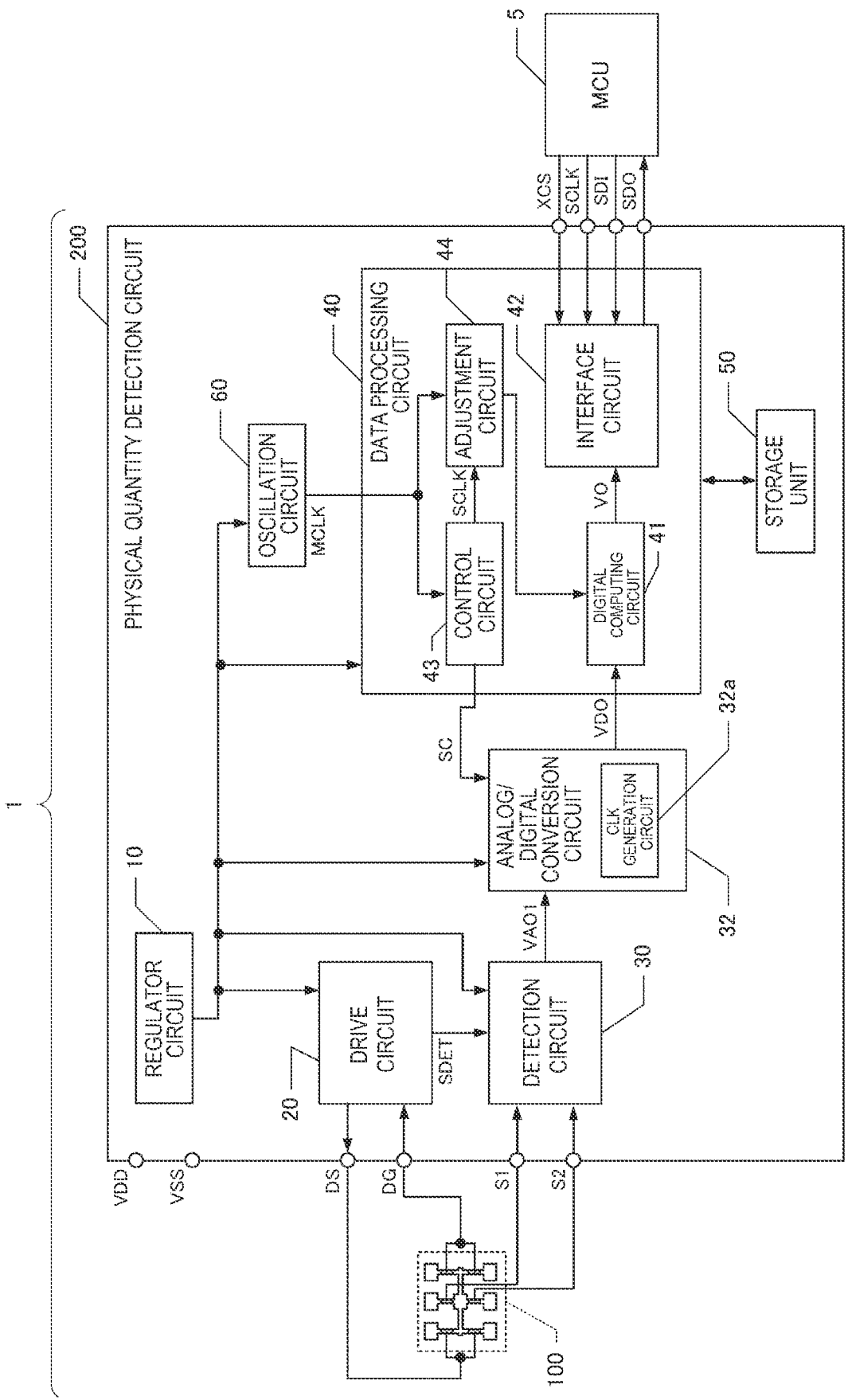
FIG. 1 is a functional block diagram of a physical quantity sensor according to a first embodiment.

FIG. 1 is a functional block diagram of a physical quantity sensor 1 according to this embodiment. The physical quantity sensor 1 includes a physical quantity detection element 100 outputting an analog signal relating to a physical quantity, and a physical quantity detection circuit 200.

The physical quantity detection element 100 has a vibrator element with a drive electrode and a detection electrode arranged therein. Generally, in order to minimize impedance of the vibrator element and increase oscillation efficiency, the vibrator element is contained in an airtight package. In this embodiment, the physical quantity detection element 100 has a so-called double-T-type vibrator element having two T-shaped drive vibration arms.

Figure 2:
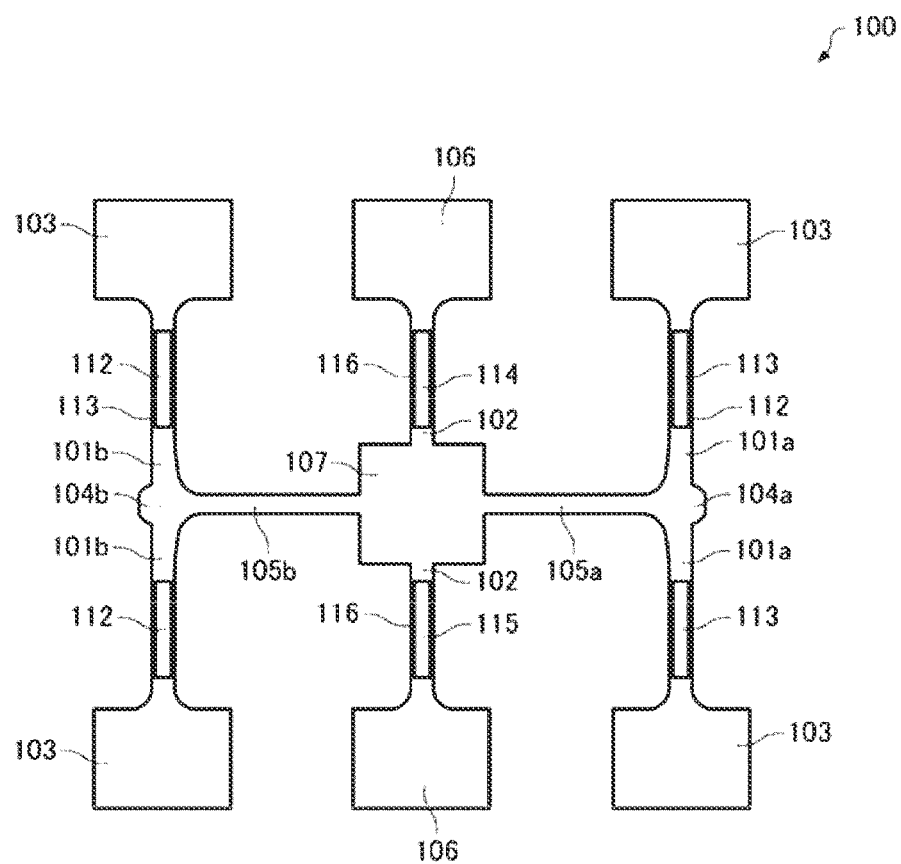
FIG. 2 is a plan view of a vibrator element of a physical quantity detection element.

FIG. 2 is a plan view of the vibrator element of the physical quantity detection element 100 in this embodiment. The physical quantity detection element 100 has, for example, a double-T-type vibrator element formed of a Z-cut quartz crystal substrate. The vibrator element formed of a quartz crystal has very little change in resonance frequency with temperature change and is therefore advantageous in that the accuracy of detecting an angular velocity can be increased. An X-axis, a Y-axis, and a Z-axis shown in FIG. 2 represent the axes of the quartz crystal. With respect to coordinates additionally provided in the drawings, a direction along the X-axis is defined as an "X-axis direction", a direction along the Y-axis is defined as a "Y-axis direction", and a direction along the Z-axis is defined as a "Z-axis direction". A direction indicated by an arrow is a positive "+" direction and a direction opposite to the arrow is a negative "−" direction.

As shown in FIG. 2, in the vibrator element of the physical quantity detection element 100, drive vibration arms 101a, 101b extend in the +Y-axis direction and the −Y-axis direction from two base parts for driving 104a, 104b, respectively. Drive electrodes 112 and 113 are formed at a lateral surface and an upper surface, respectively, of the drive vibration arm 101a. Drive electrodes 113 and 112 are formed at a lateral surface and an upper surface, respectively, of the drive vibration arm 101b. The drive electrodes 112, 113 are coupled to a drive circuit 20 via a DS terminal and a DG terminal, respectively, of the physical quantity detection circuit 200 shown in FIG. 1. The base parts for driving 104a, 104b are coupled to a rectangular base part for detection 107 via coupling arms 105a, 105b extending in the −X-axis direction and the +X-axis direction, respectively.

A detection vibration arm 102 extends in the +Y-axis direction and −Y-axis direction from the base part for detection 107. Detection electrodes 114 and 115 are formed at an upper surface of the detection vibration arm 102. A common electrode 116 is formed at a lateral surface of the detection vibration arm 102. The detection electrodes 114, 115 are coupled to a detection circuit 30 via an S1 terminal and an S2 terminal, respectively, of the physical quantity detection circuit 200 shown in FIG. 1. The common electrode 116 is grounded.

Figure 3:
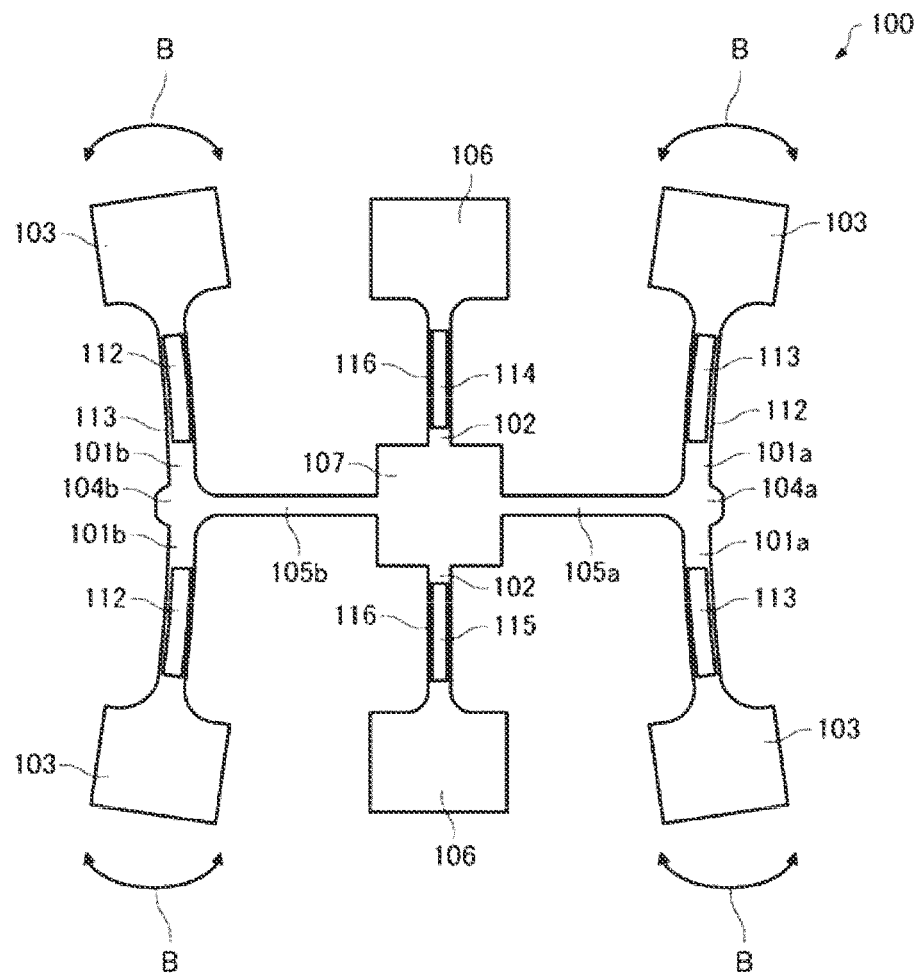
FIG. 3 explains an operation of the physical quantity detection element.

When an AC voltage is applied as a drive signal between the drive electrode 112 and the drive electrode 113 of the drive vibration arms 101a, 101b, the drive vibration arms 101a, 101b flexurally vibrate, that is, the tip ends of the two drive vibration arms 101a, 101b repeatedly move toward and away from each other as indicated by an arrow B in FIG. 3 due to an inverse piezoelectric effect. In the description below, the flexural vibration of the drive vibration arms 101a, 101b may also be referred to as "induced vibration".

Figure 4:
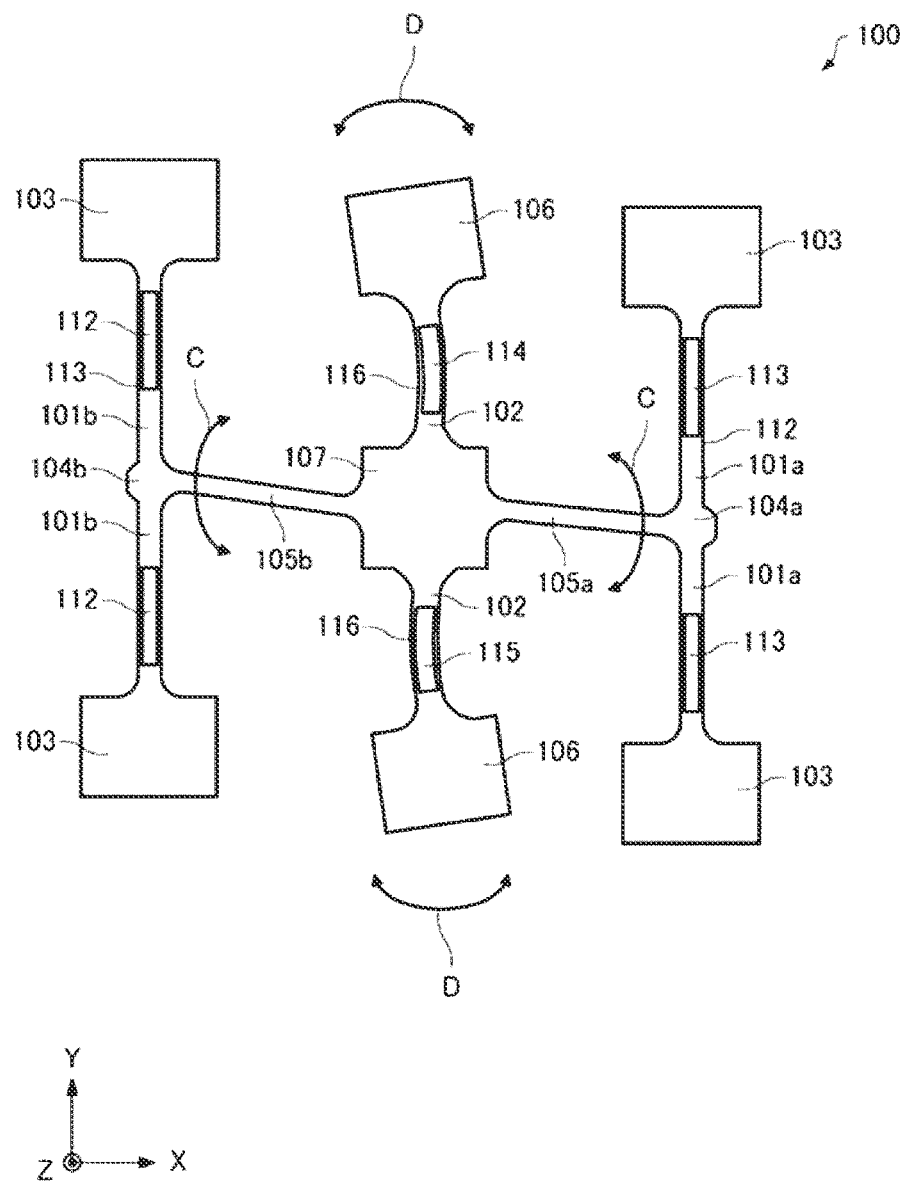
FIG. 4 explains an operation of the physical quantity detection element.

When an angular velocity about the Z-axis as the rotation axis is applied to the vibrator element of the physical quantity detection element 100 in this state, a Coriolis force in a direction perpendicular to both the direction of the flexural vibration indicated by the arrow B and the Z-axis is generated in the drive vibration arms 101a, 101b. Consequently, the coupling arms 105a, 105b vibrate as indicated by an arrow C in FIG. 4. The detection vibration arm 102 flexurally vibrates as indicated by an arrow D, linked with the vibration of the coupling arms 105a, 105b. The flexural vibration of the detection vibration arm 102 due to the Coriolis force and the flexural vibration of the drive vibration arms 101a, 101b have a 90° phase difference.

When the magnitude of the vibration energy or the magnitude of the vibration amplitude of the flexural vibration of the drive vibration arms 101a, 101b is equal between the two drive vibration arms 101a, 101b, the vibration energy is well-balanced between the drive vibration arms 101a, 101b. Therefore, the detection vibration arm 102 does not flexurally vibrate in the state where no angular velocity is applied to the physical quantity detection element 100. However, when the vibration energy is out of balance between the two drive vibration arms 101a, 101b, the detection vibration arm 102 flexurally vibrates even in the state where no angular velocity is applied to the physical quantity detection element 100. This flexural vibration, called leak vibration, is a flexural vibration in the direction indicated by the arrow D similar to the vibration based on the Coriolis force but has the same phase as the drive signal.

Due to a piezoelectric effect, an AC charge based on these flexural vibrations occurs in the detection electrodes 114, 115 of the detection vibration arm 102. The AC charge generated based on the Coriolis force changes according to the magnitude of the Coriolis force, that is, according to the magnitude of the angular velocity applied to the physical quantity detection element 100. Meanwhile, the AC charge generated based on the leak vibration is constant regardless of the magnitude of the angular velocity applied to the physical quantity detection element 100.

At the tip end of the drive vibration arms 101a, 101b, a rectangular weight part 103 having a greater width than the drive vibration arms 101a, 101b is formed. Forming the weight part 103 at the tip end of the drive vibration arms 101a, 101b enables increase in the Coriolis force and achievement of a desired resonance frequency with relatively short vibrating arms. Similarly, at the tip end of the detection vibration arm 102, a weight part 106 having a greater width than the detection vibration arm 102 is formed. Forming the weight part 106 at the tip end of the detection vibration arm 102 enables increase in the AC charge generated in the detection electrodes 114, 115.

In this way, the physical quantity detection element 100 outputs the AC charge based on the Coriolis force about the Z-axis as the detection axis, and the AC charge based on the leak vibration of the induced vibration, via the detection electrodes 114, 115. The physical quantity detection element 100 functions as an inertial sensor detecting an angular velocity. In the description below, the AC charge based on the Coriolis force may be referred to as an "angular velocity component" and the AC charge based on the leak vibration may be referred to as a "vibration leak component".

Back to the description of FIG. 1, the physical quantity detection circuit 200 includes a regulator circuit 10, the drive circuit 20, the detection circuit 30, an analog/digital conversion circuit 32, a data processing circuit 40, a storage unit 50, and an oscillation circuit 60. The physical quantity detection circuit 200 may be implemented, for example, by a one-chip integrated circuit (IC). The physical quantity detection circuit 200 may have a configuration in which a part of these components is omitted or changed or to which another component is added.

The regulator circuit 10 generates a constant voltage or constant current such as a reference voltage that is an analog ground voltage, based on a power-supply voltage vdd and a ground voltage gnd supplied from a VDD terminal and a VSS terminal of the physical quantity detection circuit 200, respectively, and supplies the constant voltage or constant current to the drive circuit 20, the detection circuit 30, the analog/digital conversion circuit 32, the data processing circuit 40, the oscillation circuit 60 and the like. The constant voltage supplied from the regulator circuit 10 to each circuit is an example of a power-supply voltage of each circuit.

The drive circuit 20 generates a drive signal for generating an induced vibration of the physical quantity detection element 100 and supplies the drive signal to the drive electrode 112 of the physical quantity detection element 100 via the DS terminal. The drive circuit 20 also receives an oscillation current generated in the drive electrode 113 by the induced vibration of the physical quantity detection element 100 and inputted via the DG terminal, and performs feedback control of the amplitude level of the drive signal in such a way as to keep the amplitude of the oscillation current constant. The drive circuit 20 also generates a wave detection signal SDET having the same phase as the drive signal and outputs the wave detection signal SDET to the detection circuit 30.

The detection circuit 30 receives the AC charges generated in the two detection electrodes 114, 115 of the physical quantity detection element 100 and inputted via the S1 terminal and the S2 terminal of the physical quantity detection circuit 200, respectively. The detection circuit 30 detects an angular velocity component included in these AC charges, using the wave detection signal SDET, and outputs an analog signal VAO1 corresponding to the magnitude of the angular velocity component to the analog/digital conversion circuit 32.

The analog/digital conversion circuit 32 receives the analog signal VAO1 inputted thereto, converts the analog signal VAO1 to a digital signal VDO having a digital value corresponding to the magnitude of the angular velocity component, and outputs the digital signal VDO. The digital signal VDO is an example of a first digital signal. In this embodiment, the analog/digital conversion circuit 32 executes analog/digital conversion synchronously with a clock signal SC outputted from a control circuit 43, described later.

The storage unit 50 has a non-volatile memory, not illustrated. In the non-volatile memory, various trimming data for the drive circuit 20 and the detection circuit 30, for example, adjustment data and correction data, are stored. Also, an adjustment value for indicating the timing when a digital arithmetic circuit 41, described later, starts arithmetic, is stored there. The adjustment value may be defined in various forms. For example, the adjustment value may be defined by the number of master clock signals MCLK, described later, or the like. In this case, the arithmetic processing by the digital arithmetic circuit 41 is started at a timing when a predetermined number of master clock signals MCLK indicated by the adjustment value are outputted after a reference timing synchronized with a master clock signal MCLK.

The non-volatile memory may be formed, for example, as a MONOS (metal-oxide-nitride-oxide-silicon)-type memory or EEPROM (electrically erasable programmable read-only memory). The storage unit 50 may also have a register, not illustrated, and may be configured in such a way that, when the power of the physical quantity detection circuit 200 is turned on, that is, when the voltage at the VDD terminal rises from 0 V to a desired voltage, the various trimming data stored in the non-volatile memory is transferred to and held in the register and the various trimming data held in the register is supplied to the drive circuit 20 and the detection circuit 30.

The oscillation circuit 60 generates a master clock signal MCLK and outputs the master clock signal MCLK to the digital arithmetic circuit 41. The oscillation circuit 60 may be formed, for example, as a ring oscillator or CR oscillation circuit.

The data processing circuit 40 includes the digital arithmetic circuit 41, an interface circuit 42, the control circuit 43, and an adjustment circuit 44. The digital arithmetic circuit 41 operates, based on the master clock signal MCLK. Specifically, the adjustment circuit 44 designates a timing for the digital arithmetic circuit 41 to start operating, based on the adjustment value stored in the storage unit 50, and thus causes the digital arithmetic circuit 41 to start arithmetic processing. For example, when the adjustment value is defined by the number of master clock signals MCLK, the control circuit 43 performs frequency division of the master clock signal MCLK outputted from the oscillation circuit 60, thus generates a reference timing signal SCLK indicating a reference timing of a predetermined cycle, and outputs the reference timing signal SCLK to the adjustment circuit 44. The adjustment circuit 44 counts the number of master clock signals MCLK from the reference timing signal SCLK, and causes the digital arithmetic circuit 41 to start arithmetic when the adjustment value has reached a predetermined number.

Figure 5:
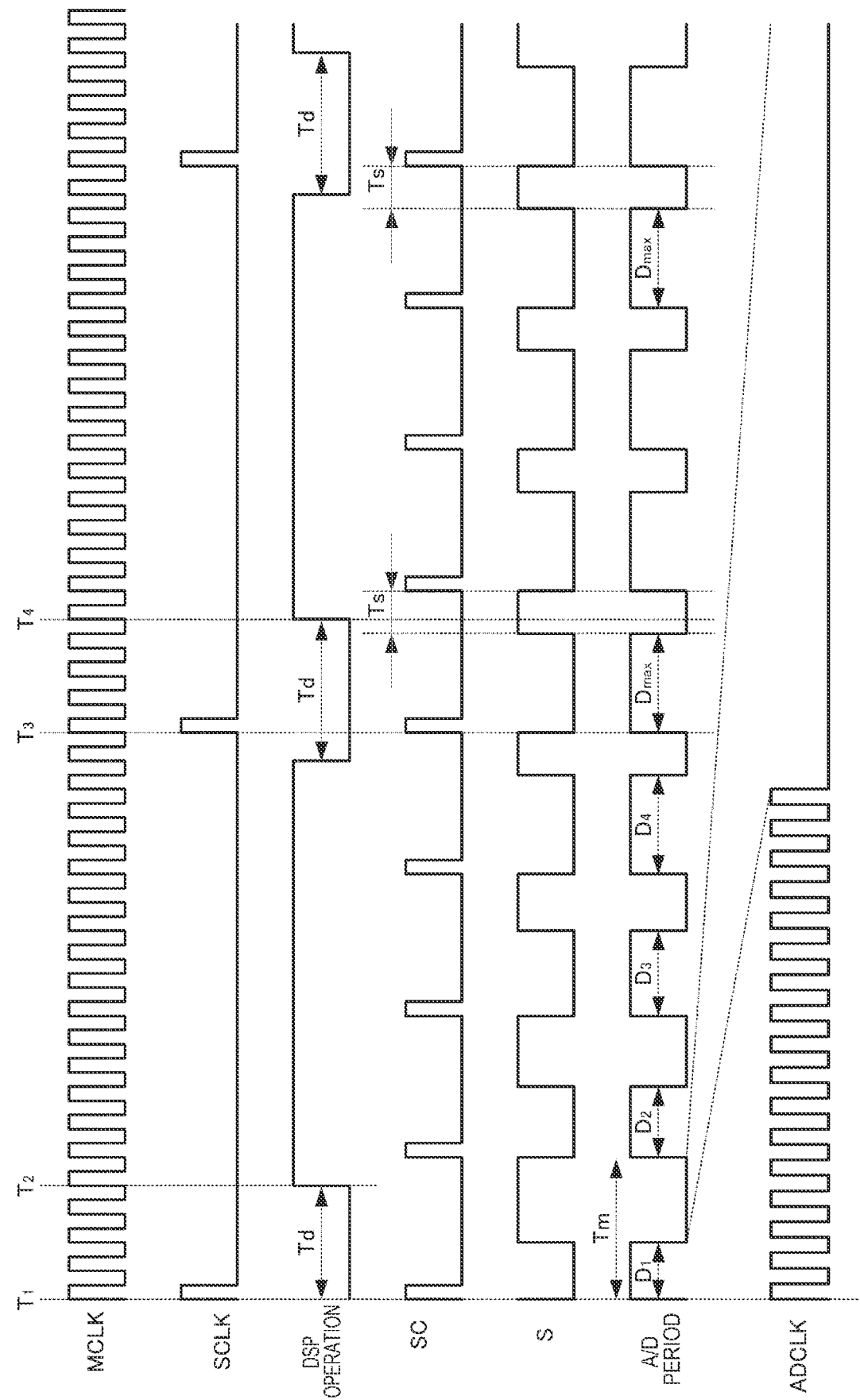
FIG. 5 explains a timing of operation of an analog/digital conversion circuit and a digital arithmetic circuit.

FIG. 5 is a timing chart for explaining the timing of various signals. As shown in FIG. 5, the master clock signal MCLK is a pulse of a predetermined cycle outputted from the oscillation circuit 60. The reference timing signal SCLK is a pulse signal of a predetermined cycle. The cycle of the reference timing signal SCLK coincides with the computation cycle of the digital arithmetic circuit 41.

In FIG. 5, the operating period of the digital arithmetic circuit 41 is referred to as "DSP operation". That is, in the example shown in FIG. 5, the adjustment circuit 44 causes the digital arithmetic circuit 41 to start arithmetic processing at the timing of rise of the fourth master clock signal MCLK after the reference timing signal SCLK. Therefore, in this embodiment, the adjustment circuit 44 adjusts the timing of an arithmetic processing start operation by the digital arithmetic circuit 41. In this embodiment, the operating period of the digital arithmetic circuit 41 is constant regardless of the content of arithmetic processing. Therefore, it can also be said that the adjustment circuit 44 adjusts the timing of the arithmetic processing start operation by the digital arithmetic circuit 41 and also adjusts timing of an arithmetic processing end operation. When the operating period of the digital arithmetic circuit 41 is variable, the adjustment circuit 44 adjusts the arithmetic processing start operation and the arithmetic processing end operation.

The digital arithmetic circuit 41 starts operating at the start timing adjusted by the adjustment circuit 44 and performs predetermined arithmetic processing on the digital signal VDO inputted from the analog/digital conversion circuit 32. That is, every time the reference timing signal SCLK is outputted, the digital arithmetic circuit 41 starts arithmetic processing after a predetermined period following the reference timing signal SCLK. The period taken by the digital arithmetic circuit 41 for arithmetic processing is constant. The digital arithmetic circuit 41 ends arithmetic processing preceding the reference timing signal SCLK by a predetermined period. By repeating this operation, the digital arithmetic circuit 41 performs one session of arithmetic processing every time the reference timing signal SCLK is outputted once. On finishing arithmetic processing, the digital arithmetic circuit 41 outputs digital data VO resulting from the arithmetic processing.

In this embodiment, the digital arithmetic circuit 41 takes in a plurality of digital signals VDO inputted thereto from the analog/digital conversion circuit 32 and outputs digital data VO. For example, the digital arithmetic circuit 41 performs arithmetic processing based on a statistical value (average or the like) of four digital signals VDO outputted from the analog/digital conversion circuit 32. In FIG. 5, an analog/digital conversion period in which the analog/digital conversion circuit 32 performs analog/digital conversion is referred to as a high-level period in an "A/D period". Analog/digital conversion periods for generating signals taken in at a timing 14 when the arithmetic processing start operation is performed by the digital arithmetic circuit 41, are expressed as $D_1$ to $D_4$. The number of digital signals VDO taken in by the digital arithmetic circuit 41 is not limited to four and may be other numeric values such as eight. The digital data VO is an example of a second digital signal.

The control circuit 43 generates a clock signal SC indicating a timing of operation of the analog/digital conversion circuit 32 and outputs the clock signal SC to the analog/digital conversion circuit 32. In this embodiment, the digital arithmetic circuit 41 takes in the digital signal VDO a predetermined number of times in the process of performing one session of arithmetic processing. Thus, the control circuit 43 generates the clock signal SC in such a way that the same number of pulses as the number of intakes of the digital signal VDO are outputted within the cycle of the reference timing signal SCLK, which is outputted once for one session of arithmetic processing by the digital arithmetic circuit 41.

For example, in the example shown in FIG. 5, the clock signal SC is generated in such a way as to be outputted four times within one cycle of the reference timing signal SCLK. Such a control circuit 43 can be implemented, for example, by a frequency division circuit performing frequency division of the master clock signal MCLK, or the like.

The analog/digital conversion circuit 32 performs analog/digital conversion synchronously with the clock signal SC and thus performs analog/digital conversion a number of times equivalent to a predetermined number of intakes within the period for one session of arithmetic processing by the digital arithmetic circuit 41. Specifically, the analog/digital conversion circuit 32 performs a sample-and-hold operation in the period before the clock signal SC, which is the period when a switch control signal S is high-level in FIG. 5. When the clock signal SC is inputted, the analog/digital conversion circuit 32 compares a reference voltage applied to a comparator with a sampled-and-held voltage and thus executes analog/digital conversion. In FIG. 5, the period when this conversion is executed is referred to as an A/D period. Details of the operation of the analog/digital conversion circuit 32 will be described later.

In response to a request from an MCU (micro control unit) 5, which is an external device to the physical quantity detection circuit 200, the interface circuit 42 performs processing of outputting the digital data VO resulting from the arithmetic processing by the digital arithmetic circuit 41 to the MCU 5, processing of reading out data stored in the non-volatile memory or the register of the storage unit 50 and outputting the data to the MCU 5, processing of writing data inputted from the MCU 5 into the non-volatile memory or the register of the storage unit 50, and the like. The interface circuit 42 is, for example, an interface circuit of an SPI (serial peripheral interface) bus. To the interface circuit 42, a selection signal, a clock signal, and a data signal transmitted from the MCU 5 are inputted via an XCS terminal, an SCLK terminal, and an SDI terminal of the physical quantity detection circuit 200. The interface circuit 42 outputs a data signal to the MCU 5 via an SDO terminal of the physical quantity detection circuit 200. The interface circuit 42 may be an interface circuit supporting various other buses than the SPI bus, for example, an I²C (inter-integrated circuit) bus or the like.

1-2. Configuration of Drive Circuit

Figure 6:
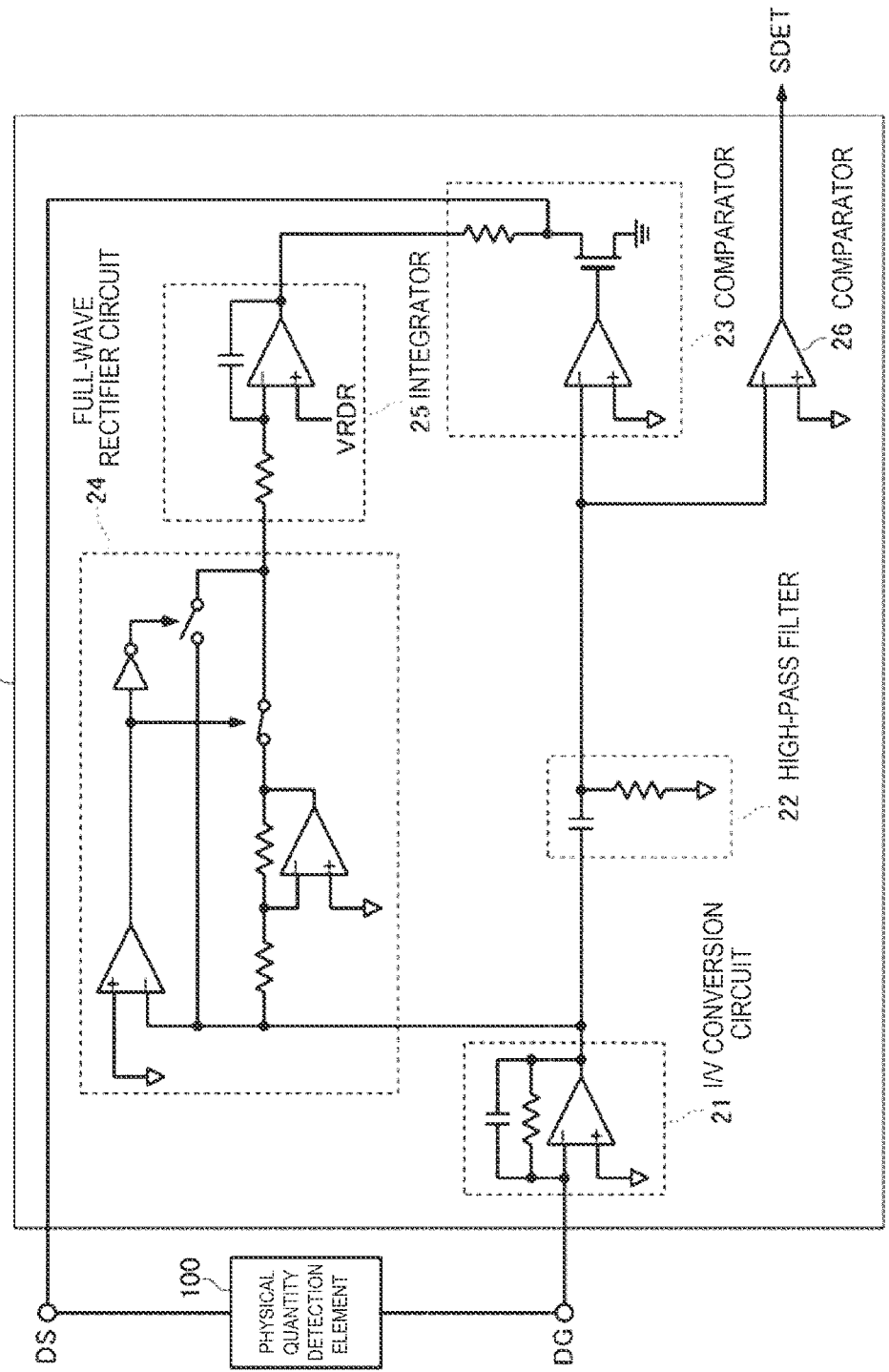
FIG. 6 shows a configuration example of a drive circuit.

The drive circuit 20 will now be described. FIG. 6 shows a configuration example of the drive circuit 20. As shown in FIG. 6, the drive circuit 20 in this embodiment includes an I/V conversion circuit 21, a high-pass filter 22, a comparator 23, a full-wave rectifier circuit 24, an integrator 25, and a comparator 26. The drive circuit 20 in this embodiment may have a configuration in which a part of these components is omitted or changed or to which another component is added.

The I/V conversion circuit 21 converts an oscillation current generated by an induced vibration of the physical quantity detection element 100 and inputted via the DG terminal, to an AC voltage signal. The high-pass filter 22 eliminates an offset of an output signal from the I/V conversion circuit 21.

The comparator 23 compares the voltage of an output signal from the high-pass filter 22 with a reference voltage and generates a binary signal. When the binary signal is high-level, the comparator 23 establishes continuity of an NMOS transistor and outputs a low-level signal. When the binary signal is low-level, the comparator 23 does not establish continuity of the NMOS transistor and outputs an output voltage from the integrator 25 pulled up via a resistor, as a high-level signal. The output signal from the comparator 23 is supplied as a drive signal to the physical quantity detection element 100 via the DS terminal. Making the frequency of this drive signal equal to the resonance frequency of the physical quantity detection element 100 enables stable oscillation of the physical quantity detection element 100.

The full-wave rectifier circuit 24 performs full-wave rectification of the output signal from the I/V conversion circuit 21 and outputs a DC signal. The integrator 25 integrates the output voltage from the full-wave rectifier circuit 24, based on a predetermined voltage VRDR supplied from the regulator circuit 10 as a reference voltage, and outputs the integrated output voltage. The output voltage from the integrator 25 becomes lower as the output from the full-wave rectifier circuit 24 becomes higher, that is, as the amplitude of the output signal from the I/V conversion circuit 21 becomes greater. Therefore, the high-level voltage of the drive signal, which is the output signal from the comparator 23, becomes lower as the oscillation amplitude becomes greater. The high-level voltage of the drive signal becomes higher as the oscillation amplitude becomes smaller. Thus, automatic gain control (AGC) is applied to keep the oscillation amplitude constant. The comparator 26 amplifies the voltage of the output signal from the high-pass filter 22, thus generates a square-wave voltage signal that is a binary signal, and outputs the square-wave voltage signal as a wave detection signal SDET.

1-3. Configuration of Detection Circuit

Figure 7:
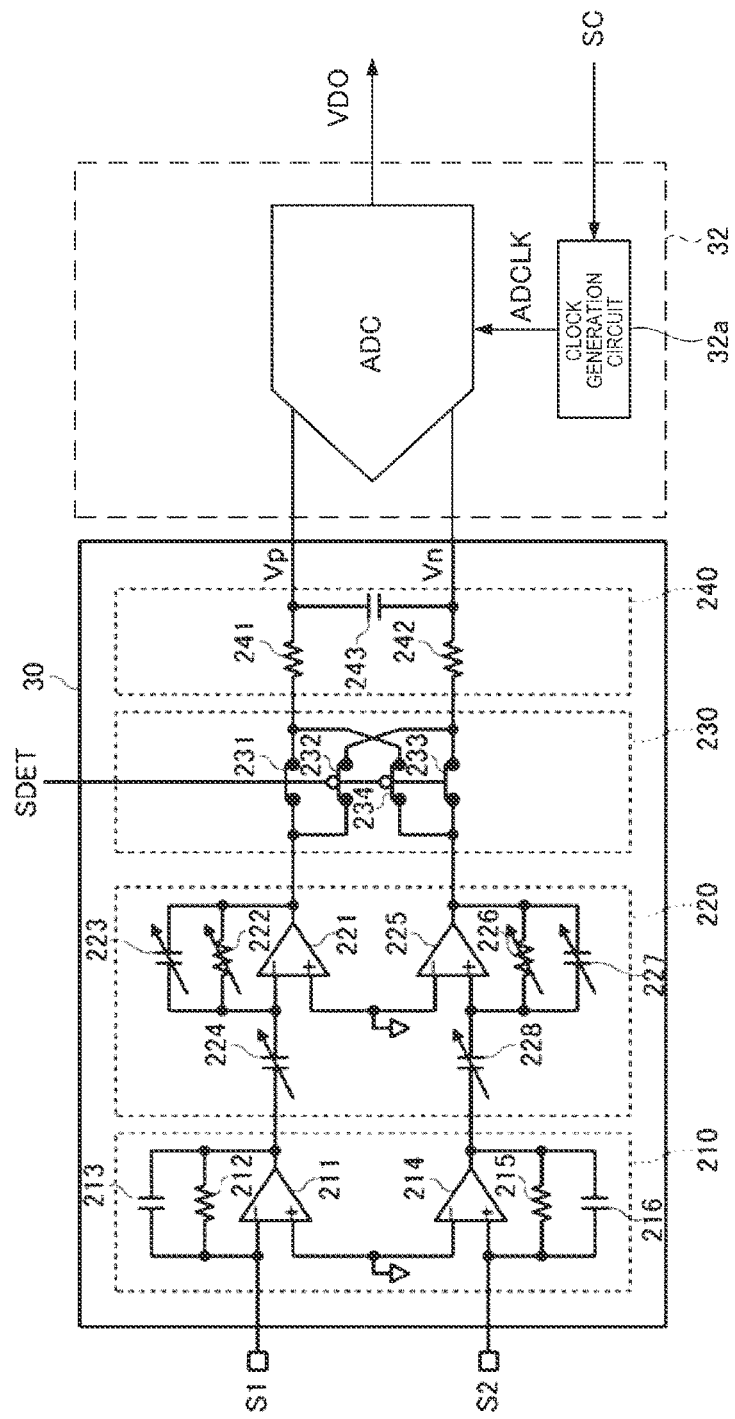
FIG. 7 shows a configuration example of a detection circuit and the analog/digital conversion circuit.

The detection circuit 30 and the analog/digital conversion circuit 32 will now be described. FIG. 7 shows a configuration example of the detection circuit 30 and the analog/digital conversion circuit 32. As shown in FIG. 7, the detection circuit 30 in this embodiment includes a Q-V conversion circuit 210, a variable gain amplifier 220, a mixer 230, and a passive filter 240. The detection circuit 30 in this embodiment may have a configuration in which a part of these components is omitted or changed or to which another component is added.

The Q-V conversion circuit 210 includes an operating amplifier 211, a resistor 212, a capacitor 213, an operating amplifier 214, a resistor 215, and a capacitor 216. An AC charge including an angular velocity component and a vibration leak component is inputted to the operating amplifier 211 from the detection electrode 114 of the vibrator element of the physical quantity detection element 100 via the S1 terminal. The resistor 212 is a feedback resistor of the operating amplifier 211. The capacitor 213 is a feedback capacitor of the operating amplifier 211. Similarly, an AC charge including an angular velocity component and a vibration leak component is inputted to the operating amplifier 214 from the detection electrode 115 of the vibrator element of the physical quantity detection element 100 via the S2 terminal.

The resistor 215 is a feedback resistor of the operating amplifier 214. The capacitor 216 is a feedback capacitor of the operating amplifier 214. The phase of the AC charge inputted to the operating amplifier 211 and the phase of the AC charge inputted to the operating amplifier 214 are different from each other by 180°. The phase of the output signal from the operating amplifier 211 and the phase of the output signal from the operating amplifier 214 are opposite to each other. The Q-V conversion circuit 210 having such a configuration converts the AC charges inputted from the S1 terminal and the S2 terminal, respectively, to voltage signals and outputs differential signals of the opposite phases. That is, the Q-V conversion circuit 210 functions as a signal conversion circuit converting an output signal from the physical quantity detection element 100 to a voltage.

The variable gain amplifier 220 includes an operating amplifier 221, a resistor 222, a capacitor 223, a capacitor 224, an operating amplifier 225, a resistor 226, a capacitor 227, and a capacitor 228. The resistors 222, 226 have variable resistance values. The capacitors 223, 224, 227, 228 have variable capacitance values.

The signal outputted from the operating amplifier 211 is inputted to the operating amplifier 221 via the capacitor 224. The resistor 222 is a feedback resistor of the operating amplifier 221. The capacitor 223 is a feedback capacitor of the operating amplifier 221. Similarly, the signal outputted from the operating amplifier 214 is inputted to the operating amplifier 225 via the capacitor 228. The resistor 226 is a feedback resistor of the operating amplifier 225. The capacitor 227 is a feedback capacitor of the operating amplifier 225. The variable gain amplifier 220 having such a configuration amplifies the differential signals outputted from the Q-V conversion circuit 210 and outputs differential signals of a desired voltage level.

The mixer 230 includes a switch 231, a switch 232, a switch 233, and a switch 234. The switches 231, 233 have continuity when the wave detection signal SDET outputted from the drive circuit 20 is high-level, and no continuity when the wave detection signal SDET is low-level. The switches 232, 234 have continuity when the wave detection signal SDET is low-level, and no continuity when the wave detection signal SDET is high-level. When the wave detection signal SDET is high-level, the mixer 230 directly outputs the differential signals outputted from the variable gain amplifier 220. When the wave detection signal SDET is low-level, the mixer 230 outputs signals having positivity and negativity reversed from the differential signals outputted from the variable gain amplifier 220. The mixer 230 having such a configuration functions as a wave detection circuit which detects the differential signals outputted from the variable gain amplifier 220, using the wave detection signal SDET, and which outputs differential signals including an angular velocity component. The differential signals outputted from the mixer 230 are signals of a voltage level corresponding to the angular velocity applied to the physical quantity detection element 100. The differential signals outputted from the mixer 230 are an example of an "analog signal based on an output signal from a physical quantity detection element".

The passive filter 240 includes a resistor 241, a resistor 242, and a capacitor 243. One end of the resistor 241 and one end of the capacitor 243 are coupled together. One end of the resistor 242 and the other end of the capacitor 243 are coupled together. The differential signals outputted from the mixer 230 are inputted to the other end of the resistor 241 and the other end of the resistor 242. The passive filter 240 having such a configuration functions as a low-pass filter outputting differential signals Vp, Vn having high-frequency noise attenuated from the differential signals outputted from the mixer 230. The differential signals Vp, Vn are equivalent to the analog signal VAO1 shown in FIG. 1.

The passive filter 240 also functions as an anti-aliasing filter to the analog/digital conversion circuit 32. The passive filter 240 does not include an active element such as a transistor generating 1/f noise and therefore has less output noise than an active filter formed of an active element. Thus, the S/N ratio of the output signal from the physical quantity sensor 1 can be improved. The passive filter 240 may be a band-pass filter, depending on the use of the physical quantity sensor 1.

1-4. Configuration of Analog/Digital Conversion Circuit

The analog/digital conversion circuit 32 will now be described. The analog/digital conversion circuit 32 has a clock generation circuit 32a. The clock generation circuit 32a is a circuit generating a clock signal ADCLK.

The clock signal ADCLK is a clock signal for causing a logic circuit 277, described later, of the analog/digital conversion circuit 32 to operate. The clock generation circuit 32a generates the clock signal ADCLK, triggered by the clock signal SC outputted from the control circuit 43. The clock generation circuit 32a is triggered by the clock signal SC but generates the clock signal ADCLK asynchronously with the clock signal SC or the master clock signal MCLK.

Figure 8:
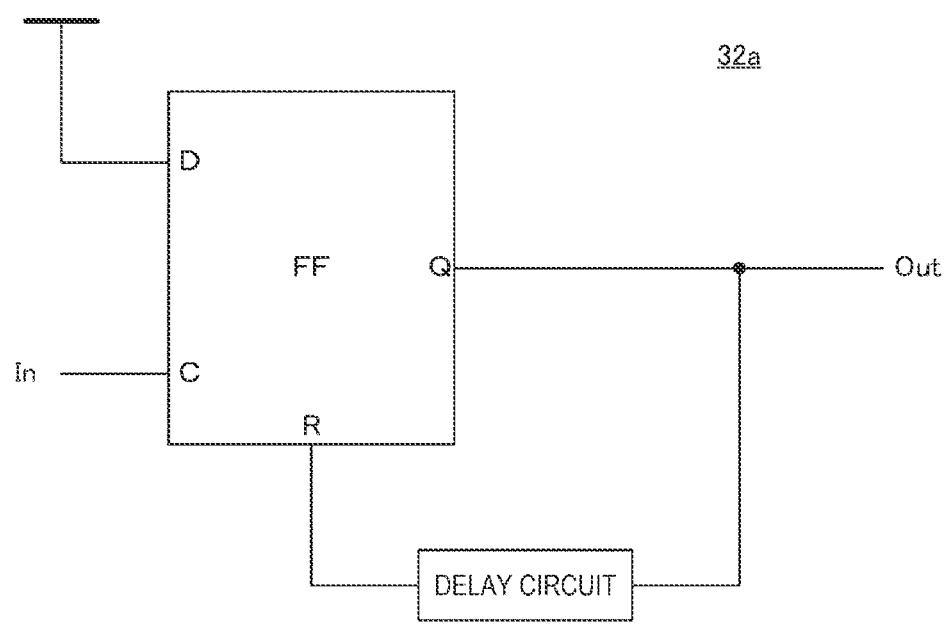
FIG. 8 shows a configuration example of a clock generation circuit.

As such a circuit, for example, a circuit as shown in FIG. 8 may be employed. The clock generation circuit 32a shown in FIG. 8 has a D flip-flop. A delay circuit is coupled between an output terminal Q and a reset terminal R of the D flip-flop. The delay circuit is formed of a plurality of stages of inverters. An input terminal D of the D flip-flop is fixed to high level. In this configuration, when an input trigger In is inputted to a clock terminal C, an output Out turns to high level. This high-level signal is delayed via the delay circuit and subsequently inputted to the reset terminal R. Therefore, at this stage, the D flip-flop is reset and the output Out turns to low level. As this operation is repeated, a continuous pulse signal is outputted to the output Out. In this example, the pulse signal is the clock signal ADCLK.

In this embodiment, the clock generation circuit 32a is stopped after the clock signal ADCLK is outputted a necessary number of times for the logic circuit 277 to operate. That is, in this embodiment, the logic circuit 277 performs analog/digital conversion while the clock generation circuit 32a is outputting the clock signal ADCLK. The period when this analog/digital conversion is performed is the analog/digital conversion period and is the period referred to as the A/D period in FIG. 5.

In FIG. 5, the clock signal ADCLK generated in the A/D period is shown. However, the scale in the direction of time is enlarged with respect to the clock signal ADCLK. The first one cycle Tm of the clock signal SC shown in FIG. 5 is enlarged and the clock signal ADCLK is shown accordingly.

The analog/digital conversion circuit 32 operates based on the clock signal ADCLK, samples the differential signals Vp, Vn to the input capacitance held by the analog/digital conversion circuit 32, and converts the differential signals Vp, Vn to digital signals.

Figure 9:
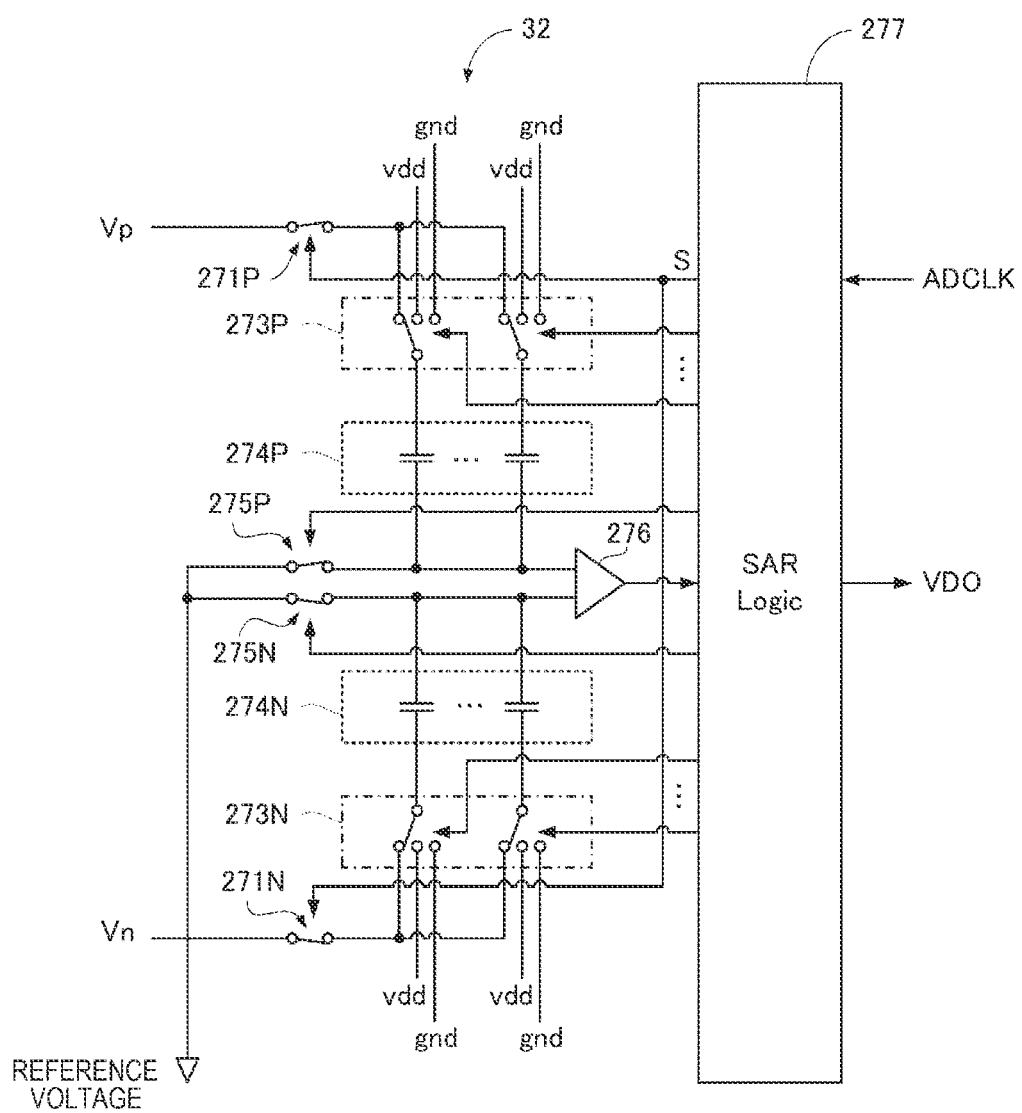
FIG. 9 shows a configuration example of the analog/digital conversion circuit.

In this embodiment, the analog/digital conversion circuit 32 is a sequential comparison-type analog/digital conversion circuit. FIG. 9 shows a configuration example of the analog/digital conversion circuit 32. As shown in FIG. 9, the analog/digital conversion circuit 32 in this embodiment includes a switch 271P, a switch 271N, a switch array 273P, a switch array 273N, a capacitance array 274P, a capacitance array 274N, a switch 275P, a switch 275N, a comparator 276, and the logic circuit 277. The analog/digital conversion circuit 32 in this embodiment may have a configuration in which a part of these components is omitted or changed or to which another component is added.

Each of the capacitance arrays 274P, 274N has a plurality of capacitors having different capacitance values from each other and functions as an input capacitance of the analog/digital conversion circuit 32. The logic circuit 277 controls the operation of the switches 271P, 271N, 275P, 275N and the switch arrays 273P, 273N based on the input clock signal ADCLK.

Specifically, the logic circuit 277 first turns a switch control signal S to high level and controls the switches 271P, 271N to have continuity, and then performs a sample-and-hold operation of sampling the input signals Vp, Vn to each capacitor in the capacitance arrays 274P, 274N.

Figure 10:
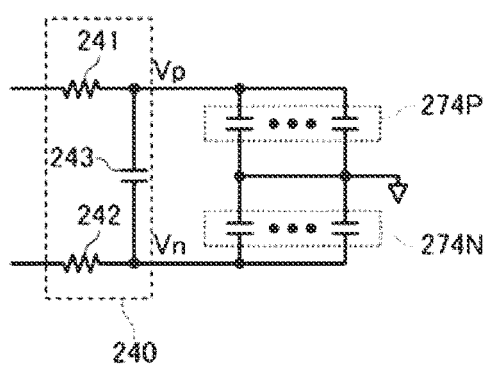
FIG. 10 shows the state of the analog/digital conversion circuit during a sampling period.

FIG. 10 shows the coupling state of the capacitance arrays 274P, 274N when the switch control signal S is high-level. In this state, the differential signal Vp outputted from the passive filter 240 is supplied to one end of each capacitor in the capacitance array 274P. The differential signal Vn outputted from the passive filter 240 is supplied to one end of each capacitor in the capacitance array 274N. A reference voltage is supplied to the other end of each capacitor in the capacitance arrays 274P, 274N.

Next, when a predetermined time necessary for sampling has passed since the switch control signal S is changed from low level to high level, the logic circuit 277 changes the switch control signal S from high level to low level. In this embodiment, the period when the switch control signal S is low-level is the analog/digital conversion period. When the switch control signal S turns to low level, the logic circuit 277 controls the switches 271P, 271N to have no continuity and controls the switches 275P, 275N to have no continuity. The logic circuit 277 repeats, N times, the operation of switching the switch arrays 273P, 273N according to whether the binary signal outputted from the comparator 276 is high-level or low-level, so as to apply the power-supply voltage vdd or the ground voltage gnd to each capacitor in the capacitance arrays 274P, 274N. The logic circuit 277 performs parallel conversion of the binary signal outputted from the comparator 276 and thus generates an N-bit digital signal VDO having a digital value corresponding to the difference between the voltage of the input signal Vp and the voltage of the input signal Vn.

Figure 11:
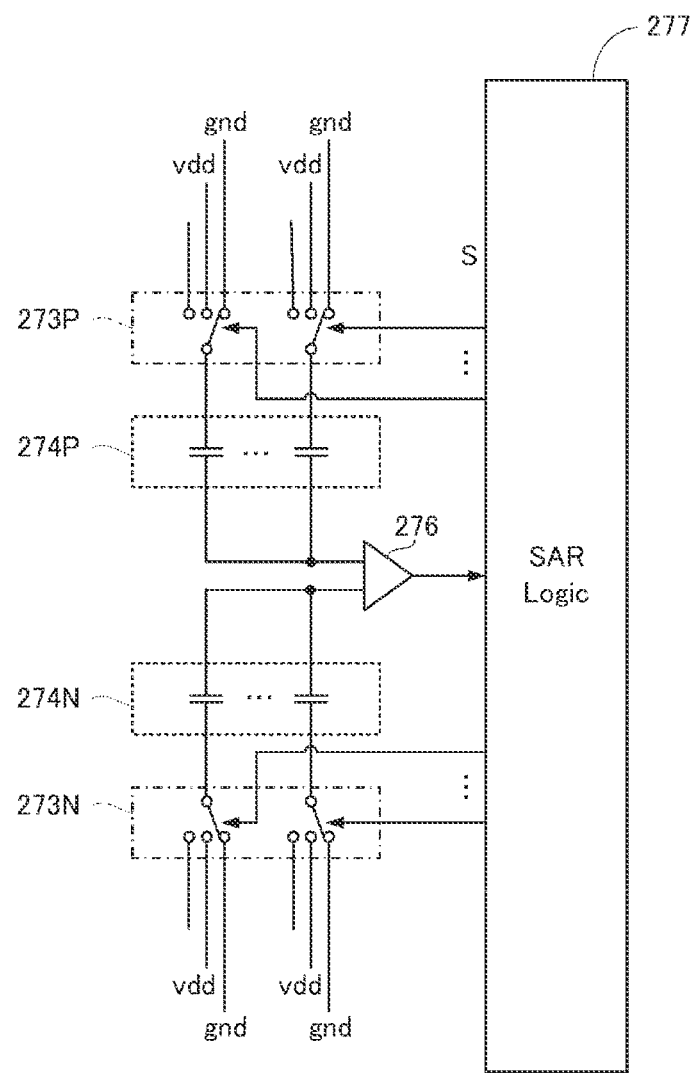
FIG. 11 shows the state of the analog/digital conversion circuit during an analog/digital conversion period.

FIG. 11 shows the coupling state of the capacitance arrays 274P, 274N when the switch control signal S is low-level, that is, during the analog/digital conversion period. In this state, the switch array 273P is controlled by a control signal from the logic circuit 277. One end of each capacitor in the capacitance array 274P is coupled to the power-supply voltage vdd or the ground voltage gnd. The other end of each capacitor in the capacitance array 274P is coupled to one input terminal of the comparator 276. Also, the switch array 273N is controlled by a control signal from the logic circuit 277. One end of each capacitor in the capacitance array 274N is coupled to the power-supply voltage vdd or the ground voltage gnd. The other end of each capacitor in the capacitance array 274N is coupled to the other input terminal of the comparator 276.

1-5. Improvement in Accuracy of A/D Conversion

The analog/digital conversion circuit 32 in this embodiment operates, using a power-supply voltage generated by the regulator circuit 10, and converts an analog signal to a digital signal, based on the comparison by the comparator 276. Therefore, when the power-supply voltage changes, the accuracy of analog/digital conversion may drop. In this embodiment, as described above, the analog/digital conversion circuit 32 and the data processing circuit 40 receive and are driven by electric power supplied from the same regulator circuit 10. Therefore, when the power consumption by the data processing circuit 40 suddenly changes, the voltage supplied to the analog/digital conversion circuit 32 may change. In this case, the power-supply voltage used by the analog/digital conversion circuit 32 may change. As the power-supply voltage changes, the digital signal VDO outputted from the analog/digital conversion circuit 32 may have a different value from the original value.

In this embodiment, a sudden change in the power consumption by the data processing circuit 40 occurs at the timing of the arithmetic processing start operation and the timing of the arithmetic processing end operation by the digital arithmetic circuit 41. Therefore, if at least one of the timing of the arithmetic processing start operation and the timing of the arithmetic processing end operation is included in the analog/digital conversion period of the analog/digital conversion circuit 32, the accuracy of conversion by the analog/digital conversion circuit 32 may drop.

Thus, in this embodiment, the digital arithmetic circuit 41 is configured to perform the arithmetic processing start operation and the arithmetic processing end operation during a period that is not the analog/digital conversion period. Specifically, the analog/digital conversion period in this embodiment starts, triggered by the clock signal SC. Thus, in this embodiment, an analog/digital conversion period of a maximum length required for the conversion by the analog/digital conversion circuit 32 is specified, based on the design of the physical quantity detection element 100 and the analog/digital conversion circuit 32, and actual measurements or the like.

In this embodiment, a timing later than the timing of the end of the analog/digital conversion period and earlier than the next clock signal SC when the analog/digital conversion period has the maximum length is specified in advance. An adjustment value for indicating a timing for the digital arithmetic circuit 41 to start arithmetic is specified in such a way that the arithmetic processing by the digital arithmetic circuit 41 starts at the timing.

Also, the adjustment value is specified in such a way that the arithmetic processing by the digital arithmetic circuit 41 ends at a timing later than the timing of the end of the analog/digital conversion period and earlier than the next clock signal SC when the analog/digital conversion period has the maximum length. The arithmetic processing start operation and the arithmetic processing end operation are performed by the digital arithmetic circuit 41, based on this adjustment value. Therefore, the digital arithmetic circuit 41 can perform the arithmetic processing start operation and the arithmetic processing end operation during a period that is not the analog/digital conversion period. Thus, in this embodiment, the analog/digital conversion circuit 32 can execute digital conversion without having a drop in the accuracy of conversion.

In this embodiment, the analog/digital conversion period changes, depending on temperature or the like. This temperature characteristic may be different from the temperature characteristic of the cycle of the master clock signal MCLK. Specifically, the clock signal ADCLK, which is the operating clock of the analog/digital conversion circuit 32 in this embodiment, is generated by the clock generation circuit 32a. Meanwhile, the master clock signal MCLK or the reference timing signal SCLK, which is the operating clock of the digital arithmetic circuit 41, is generated by the oscillation circuit 60. The clock signal SC, which is the operation trigger of the clock generation circuit 32a, is generated based on the master clock signal MCLK. However, the clock signal ADCLK is generated by the clock generation circuit 32a without depending on the master clock signal MCLK. Thus, in this embodiment, the operating clock of the analog/digital conversion circuit 32 and the operating clock of the digital arithmetic circuit 41 are generated by different clock generation circuits.

In this embodiment, due to the different generation circuits generating the operating clocks, the temperature characteristic of the change in the analog/digital conversion period is different from the temperature characteristic of the change in the cycle of the master clock signal MCLK. Therefore, the analog/digital conversion period may change even if the master clock signal MCLK, the reference timing signal SCLK, and the clock signal SC have a constant cycle.

In FIG. 5, the way the analog/digital conversion period changes is accentuated. For example, the analog/digital conversion periods $D_1$ to $D_4$ have different lengths. Since the analog/digital conversion period may change depending on temperature or the like in this way, the analog/digital conversion period of the maximum length required for the conversion by the analog/digital conversion circuit 32 is specified in advance, as described above.

In FIG. 5, an example of the analog/digital conversion period of the maximum length is referred to as Dmax. The adjustment value is adjusted in such a way that the arithmetic processing start operation and the arithmetic processing end operation by the digital arithmetic circuit 41 fall within a period Ts between the timing of the end of the analog/digital conversion period and the timing of output of the next clock signal SC in the case of the analog/digital conversion period of the maximum length Dmax.

In the above configuration, the digital arithmetic circuit 41 does not perform the arithmetic processing start operation and the arithmetic processing end operation during the analog/digital conversion period when the comparator in the analog/digital conversion circuit 32 uses the power-supply voltage to perform analog/digital conversion. Therefore, the accuracy of conversion by the analog/digital conversion circuit 32 does not drop even when the output voltage from the regulator circuit 10 changes due to the arithmetic processing start operation and the arithmetic processing end operation by the digital arithmetic circuit 41.

1-6. Modification Examples

In the above embodiment or an embodiment described later, the input signal to the analog/digital conversion circuit 32 is a differential signal. However, the input signal may be a single-ended signal. In this case, the differential signal outputted from the physical quantity detection element 100 is converted to a single-ended signal at one of the Q-V conversion circuit 210, the variable gain amplifier 220, the mixer 230, and the passive filter 240 in the detection circuit 30. For example, the variable gain amplifier 220 may convert the differential signal outputted from the Q-V conversion circuit 210 to a single-ended signal. The mixer 230 and the passive filter 240 may perform each of the foregoing processing on the single-ended signal.

In the above embodiment, an angular velocity sensor including the physical quantity detection element 100 detecting an angular velocity is employed as an example of the physical quantity sensor 1. However, the physical quantity detected by the physical quantity detection element 100 is not limited to an angular velocity and may be an angular acceleration, acceleration, velocity, force or the like. The vibrator element of the physical quantity detection element 100 is not limited to a double-T type and may be, for example, a tuning fork type or interdigital type, or may be a tuning bar having the shape of a triangular prism, quadrangular prism, cylinder, or the like. As the material of the vibrator element of the physical quantity detection element 100, for example, a piezoelectric material such as a piezoelectric single crystal like lithium tantalate ($LiTaO_3$) or lithium niobate ($LiNbO_3$) or a piezoelectric ceramic like lead zirconate titanate (PZT), or a silicon semiconductor may be used, instead of quartz crystal ($SiO_2$). The vibrator element of the physical quantity detection element 100 may have, for example, a structure in which a piezoelectric thin film of zinc oxide (ZnO), aluminum nitride (AlN) or the like held between drive electrodes is arranged at a part of the surface of a silicon semiconductor. The physical quantity detection element 100 is not limited to a piezoelectric-type element and may be a vibrating-type element such as an electrokinetic, electrostatic capacitance, eddy-current, optical, or strain gauge-type element. For example, the physical quantity detection element 100 may be an electrostatic capacitance-type MEMES (micro-electromechanical systems) vibrator. The detection method by the physical quantity detection element 100 is not limited to a vibrating-type method and may be, for example, optical, rotary, fluid-based.

In the above embodiment, a one-axis sensor having one physical quantity detection element 100 is employed as an example of the physical quantity sensor 1. However, the physical quantity sensor 1 may be a multi-axis sensor having a plurality of physical quantity detection elements 100. For example, the physical quantity sensor 1 may be a three-axis gyro sensor having three physical quantity detection elements detecting an angular velocity about three different axes, or a composite sensor which has a physical quantity detection element detecting an angular velocity and a physical quantity detection element detecting an acceleration.

2. Second Embodiment

The configuration to prevent a drop in the accuracy of conversion by the analog/digital conversion circuit 32 due to a voltage change in the regulator circuit 10 is not limited to the first embodiment. That is, it suffices that the digital arithmetic circuit 41 is configured not to perform the arithmetic processing start operation and the arithmetic processing end operation during the analog/digital conversion period when analog/digital conversion is performed.

As such a configuration, the digital arithmetic circuit 41 may be configured to perform arithmetic processing at least during the analog/digital conversion period. That is, when the digital arithmetic circuit 41 is configured to perform arithmetic processing during the analog/digital conversion period without exception, the digital arithmetic circuit 41 is configured not to perform the arithmetic processing start operation and the arithmetic processing end operation during the analog/digital conversion period.

The configuration of the digital arithmetic circuit to perform arithmetic processing at least during the analog/digital conversion period may be implemented by causing the digital arithmetic circuit 41 to constantly perform arithmetic processing. That is, when the digital arithmetic circuit 41 is configured to constantly perform arithmetic processing, a clear-cut arithmetic processing start operation or a clear-cut arithmetic processing end operation is not performed. Thus, the digital arithmetic circuit 41 is configured not to perform the arithmetic processing start operation and the arithmetic processing end operation during the analog/digital conversion period.

As such a configuration, for example, the digital arithmetic circuit 41 may be configured to perform arithmetic processing also during the period Td shown in FIG. 5. Specifically, such a configuration can be achieved by causing the digital arithmetic circuit 41 to alternately repeat first arithmetic processing, which is arithmetic processing on the first digital signal, and second arithmetic processing, which is not used to output the second digital signal, in a configuration similar to the configuration shown in FIG. 1. That is, during the operating period of the digital arithmetic circuit 41 shown in FIG. 5, the first arithmetic processing, in which arithmetic processing is performed on the first digital signal to output the second digital signal, is executed. During the period Td, the second arithmetic processing is executed.

Figure 12:
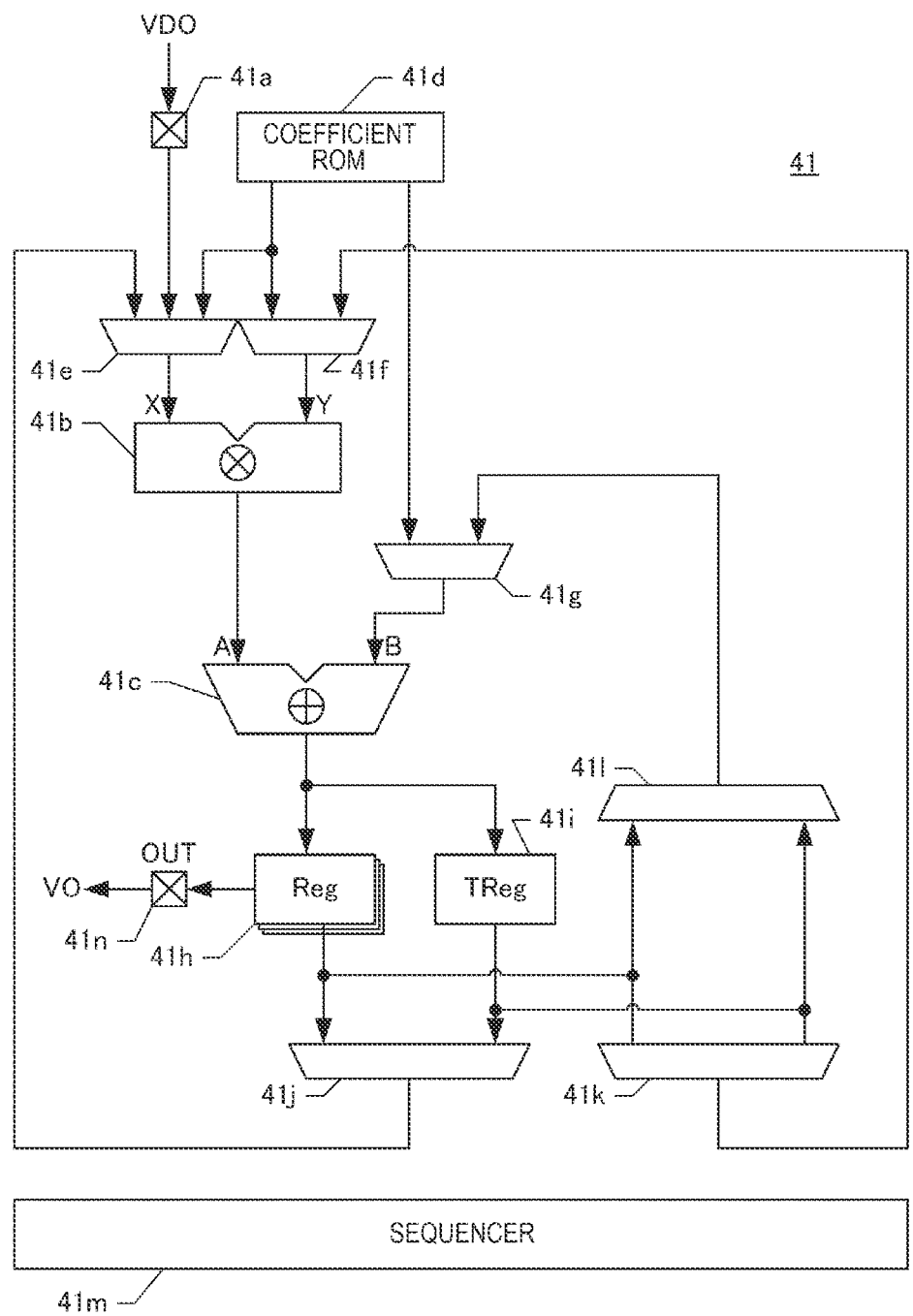
FIG. 12 shows a configuration example of the digital arithmetic circuit.

The digital arithmetic circuit 41 operating in this way is implemented, for example, by a circuit shown in FIG. 12. The digital arithmetic circuit 41 shown in FIG. 12 has an input unit 41a, a multiplier 41b, an adder 41c, a coefficient ROM 41d, a multiplier X input selector 41e, a multiplier Y input selector 41f, an adder B input selector 41g, a computation result storage register 41h, a general-purpose register 41i, register output selectors 41j, 41k, 41l, a sequencer 41m, and an output unit 41n.

The sequencer 41m controls each selector of the multiplier X input selector 41e, the multiplier Y input selector 41f, the adder B input selector 41g, and the register output selectors 41j, 41k, 41l, based on the adjustment value stored in the storage unit 50. The sequencer 41m also controls each register of the computation result storage register 41h holding a result of computation and the general-purpose register 41i. That is, the sequencer 41m controls each selector and thus selects a necessary arithmetic input, then causes the multiplier 41b and the adder 41c to execute product-sum calculation, and causes the register to store the result of the calculation. The coefficient ROM 41d is a ROM holding a coefficient. The coefficient may be adjusted, based on the adjustment value stored in the storage unit 50.

In this embodiment, the computation result storage register 41h is a register used by type of arithmetic processing, such as a register holding a filter tap or a register holding a result of computation. Meanwhile, the general-purpose register 41i is a register temporarily holding a result of intermediate processing.

In this embodiment, an adjustment value for the first arithmetic processing and an adjustment value for the second arithmetic processing are stored in the storage unit 50. The sequencer 41m starts the first arithmetic processing at a prescribed timing synchronized with the reference timing signal SCLK. That is, the sequencer 41m takes in the digital signals VDO corresponding to a predetermined number of intakes at a rate of once per reference timing signal SCLK, controls each selector, and thus selects an input X or Y to the multiplier 41b. The sequencer 41m controls each selector and thus selects an input B to the adder 41c. The sequencer 41m then controls each selector, thus selects a register, and causes the register to hold the result of computation. Thus, digital data VO is outputted from the output unit 41n.

Meanwhile, the sequencer 41m executes the second arithmetic processing during a period from the timing when the first arithmetic processing ends to the timing when the next first arithmetic processing starts. In this case, at the timing when the first arithmetic processing ends, the sequencer 41m starts the second arithmetic processing, based on the adjustment value for the second arithmetic processing. In this embodiment, the period taken for the first arithmetic processing is constant and is specified in advance. The cycle of the reference timing signal SCLK is a period determined based on the master clock signal MCLK and is specified in advance. Therefore, the length of the period Td when the second arithmetic processing should be executed is known, too.

Thus, the adjustment value for the second arithmetic processing is predetermined in such a way as to cause the sequencer 41m to execute arithmetic processing for the same length of time as the period Td. Therefore, the sequencer 41m executes the second arithmetic processing during the period Td, ends the second arithmetic processing when the period Td ends, and then starts the first arithmetic processing. The digital signal inputted to the input unit 41a in the second arithmetic processing may be the same as in the first arithmetic processing or may be a different value.

In this embodiment, at least a part of the second arithmetic processing is the same as the first arithmetic processing. That is, the adjustment value for the second arithmetic processing is information for executing apart of the first arithmetic processing. As apart of the second arithmetic processing is the same as the first arithmetic processing in this way, the power consumption for the second arithmetic processing is substantially the same as the power consumption for the first arithmetic processing and therefore the statistical range of fluctuation of power consumption falls within a prescribed range. Therefore, in this embodiment, the power consumption by the digital arithmetic circuit 41 does not change largely. Thus, the output voltage from the regulator circuit 10 does not change due to the digital arithmetic circuit 41. The accuracy of analog/digital conversion does not drop even when the digital arithmetic circuit 41 and the analog/digital conversion circuit 32 share the regulator circuit 10.

It suffices that the second arithmetic processing is executed between sessions of the first arithmetic processing and that the presence of the second arithmetic processing restrains a change in the power consumption by the digital arithmetic circuit 41, thus preventing a drop in the accuracy of conversion by the analog/digital conversion circuit 32. Therefore, the power consumption for the first arithmetic processing and the power consumption for the second arithmetic processing may be different from each other. For example, the power consumption for the second arithmetic processing may be lower than the power consumption for the first arithmetic processing.

Such a configuration, too, can be implemented by adjusting the adjustment value for the second arithmetic processing. Specifically, in the digital arithmetic circuit 41 shown in FIG. 12, fixed values may be selected and inputted as the input X and the input Y to the multiplier 41b. Thus, a constant value is outputted from the multiplier 41b, which is formed of a combinational circuit. The operation of the digital arithmetic circuit 41 is thus practically stopped. Then, each selector may be controlled in such a way that, for example, a value from the general-purpose register 41i is inputted to the adder 41c. Thus, the multiplier 41b is stopped and the adder 41c is made to operate.

When the adjustment value is selected in such a way as to cause the sequencer 41m to perform such processing, the state where electric power is consumed by the operation of the adder 41c while power consumption by the multiplier 41b is prevented is achieved. Thus, the power consumption for the second arithmetic processing is restrained and the presence of the second arithmetic processing prevents a sudden change in the power consumption by the digital arithmetic circuit 41 at the start and end of the first arithmetic processing. Therefore, a drop in the accuracy of analog/digital conversion can be prevented even when the digital arithmetic circuit 41 and the analog/digital conversion circuit 32 share the regulator circuit 10.

3. Other Embodiments

The analog/digital conversion circuit may be able to perform analog/digital conversion processing on an analog signal based on an output signal from the physical quantity detection element and output a first digital signal. The conversion method by the analog/digital conversion circuit is not limited. That is, any analog/digital conversion circuit which converts an analog signal to a digital signal based on a power-supply voltage supplied from the regulator circuit and therefore whose accuracy of outputting a digital signal may drop according to a change in the output voltage from the regulator circuit may be employed. Therefore, a circuit other than the SAR-type analog/digital conversion circuit as described in the above embodiments, such as a delta-sigma-type circuit having a comparator, may be employed.

The digital arithmetic circuit may be a circuit which has a first digital signal inputted thereto, performs arithmetic processing on the first digital signal, and outputs a second digital signal. That is, a digital arithmetic circuit which is driven by a power-supply voltage supplied from the regulator circuit and in which electric power supplied from the regulator circuit largely changes at a start timing when an arithmetic processing start operation is performed and at an end timing when an arithmetic processing end operation is performed may be employed. The arithmetic processing and the circuit for performing the arithmetic processing are not limited to those in the above embodiments. Various kinds of processing and circuit may be employed.

The digital arithmetic circuit may be configured not to perform an arithmetic processing start operation to start arithmetic processing and an arithmetic processing end operation to end arithmetic processing, during an analog/digital conversion period. Therefore, the digital arithmetic circuit configured to perform second arithmetic processing is not limited to being configured to continue performing the second arithmetic processing or the original first arithmetic processing as in the above embodiments. For example, the second arithmetic processing or the first arithmetic processing may be performed during the analog/digital conversion period, whereas the arithmetic processing start operation and the arithmetic processing end operation may be performed during a period that is not the analog/digital conversion period. Thus, there may be a period when no arithmetic processing is performed.

The regulator circuit may be a circuit supplying a power-supply voltage to the analog/digital conversion circuit and the digital arithmetic circuit. That is, the regulator circuit may be a circuit which generates a prescribed voltage based on electric power supplied from outside and supplies the prescribed voltage to an arbitrary circuit. The target circuits to which the power-supply voltage is supplied include at least the analog/digital conversion circuit and the digital arithmetic circuit and may also include another circuit. The voltage value is not limited and may be the same or different between the analog/digital conversion circuit and the digital arithmetic circuit.

The configuration in which the operating clock of the analog/digital conversion circuit and the operating clock of the digital arithmetic circuit are generated by different clock generation circuits is not limited to the foregoing configuration. That is, when the operating clock of the analog/digital conversion circuit and the operating clock of the digital arithmetic circuit are generated by different clock generation circuits, the relationship between the analog/digital conversion period, and the arithmetic processing start operation and the arithmetic processing end operation, is not constant. Therefore, the arithmetic processing start operation and the arithmetic processing end operation need to be controlled not to fall within the analog/digital conversion period even when the analog/digital conversion period changes. Such a problem can occur due to the different clock generation circuits for the analog/digital conversion circuit and the digital arithmetic circuit. Therefore, the clock generation circuits may differ from each other or may partly overlap each other.

The above embodiments and modification examples are examples and not limiting. For example, the embodiments and the modification examples may be suitably combined together. The present disclosure includes a configuration that is substantially the same as a configuration described in the embodiments, for example, a configuration having the same function, method, and effect, or a configuration having the same objective and effect. The present disclosure also includes a configuration described in the embodiments from which a non-essential part is replaced. The present disclosure also includes a configuration having the same advantageous effect as a configuration described in the embodiments or a configuration achieving the same objective as a configuration described in the embodiments. The present disclosure also includes a configuration described in the embodiments with a known technique added thereto.

What is claimed is:
1. A physical quantity detection circuit comprising:
an oscillation circuit generating a master clock signal;
a control circuit receiving the master clock signal and performing frequency division of the master clock signal to form a reference timing signal and a first clock signal, a plurality of cycles of the first clock signal being within one cycle of the reference timing signal;
an adjustment circuit receiving the reference timing signal and adjusting a start time and an end time of arithmetic processing of a digital arithmetic circuit;

an analog/digital conversion circuit performing each of two or more periods of analog/digital conversion processing on an analog signal based on an output signal from a physical quantity detection element in response to the first clock signal and outputting a first digital signal at an end of the each of the two or more periods of the analog/digital conversion processing;

the digital arithmetic circuit having a plurality of the first digital signals inputted thereto, and performing each of two or more periods of the arithmetic processing on the plurality of the first digital signals wherein one period of the arithmetic processing starts at the start time and ends at the end time, and outputting a second digital signal at the end time; and a regulator circuit supplying a power-supply voltage to the analog/digital conversion circuit and the digital arithmetic circuit, wherein the start time and the end time of the one period of the arithmetic processing are outside of each of the two or more periods of the analog/digital conversion processing, and at least one period of the analog/digital conversion processing exists within one period of the arithmetic processing.

2. The physical quantity detection circuit according to claim 1, wherein
an operating clock of the analog/digital conversion circuit and an operating clock of the digital arithmetic circuit are generated by different clock generation circuits.

3. The physical quantity detection circuit according to claim 1, wherein
the digital arithmetic circuit alternately repeats first arithmetic processing and second arithmetic processing,
the first arithmetic processing is executed to perform the arithmetic processing on the first digital signal and output the second digital signal during an operation period of the digital arithmetic circuit, and
the second arithmetic processing is executed during a period other than the operation period of the digital arithmetic circuit.

4. The physical quantity detection circuit according to claim 3, wherein
power consumption for the second arithmetic processing is substantially the same as power consumption for the first arithmetic processing.

5. The physical quantity detection circuit according to claim 3, wherein
power consumption for the second arithmetic processing is lower than power consumption for the first arithmetic processing.

6. The physical quantity detection circuit according to claim 1, further comprising:
a storage unit storing an adjustment value, wherein
the adjustment circuit adjusts the start time and the end time of the arithmetic processing of the digital arithmetic circuit based on the adjustment value.

7. A physical quantity sensor comprising:
the physical quantity detection circuit according to claim 1; and
the physical quantity detection element.

8. An operating method for a physical quantity detection circuit, the physical quantity detection circuit including:
an oscillation circuit generating a master clock signal;
a control circuit receiving the master clock signal and performing frequency division of the master clock signal to form a reference timing signal and a first clock signal, a plurality of cycles of the first clock signal being within one cycle of the reference timing signal;
an adjustment circuit receiving the reference timing signal and adjusting a start time and an end time of arithmetic processing of a digital arithmetic circuit;
an analog/digital conversion circuit performing each of two or more periods of analog/digital conversion processing on an analog signal based on an output signal from a physical quantity detection element in response to the first clock signal and outputting a first digital signal at an end of the each of the two or more periods of the analog/digital conversion processing;
the digital arithmetic circuit having a plurality of the first digital signals inputted thereto, and performing each of two or more periods of the arithmetic processing on the plurality of the first digital signals wherein one period of the arithmetic processing starts at the start time and ends at the end time, and outputting a second digital signal at the end time; and
a regulator circuit supplying a power-supply voltage to the analog/digital conversion circuit and the digital arithmetic circuit,
the operating method comprising:
causing the digital arithmetic circuit not to start the one period of the arithmetic processing at the start time and end the one period of the arithmetic processing at the end time during each of the two or more periods of the analog/digital conversion processing during which the analog/digital conversion processing is performed,
wherein at least one period of the analog/digital conversion processing exists within one period of the arithmetic processing.

* * * * *